(12) United States Patent
Lee et al.

(10) Patent No.: US 8,160,632 B2
(45) Date of Patent: Apr. 17, 2012

(54) METHOD FOR CONTROLLING POWER IN DUAL-STANDBY MODE MOBILE TERMINAL AND APPARATUS THEREOF

(75) Inventors: Mathew Lee, Seongnam-si (KR); Young Deuk An, Suwon-si (KR); Ki Yong Lee, Suwon-si (KR); Jae Suk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 12/431,343

(22) Filed: Apr. 28, 2009

(65) Prior Publication Data

US 2009/0286576 A1 Nov. 19, 2009

(30) Foreign Application Priority Data

May 13, 2008 (KR) .................. 10-2008-0044078

(51) Int. Cl.
*H04B 7/00* (2006.01)

(52) U.S. Cl. ..... 455/522; 455/68; 455/422.1; 455/435.2; 455/561; 455/562.1; 370/311; 370/342; 370/465

(58) Field of Classification Search .............. 455/68, 455/115.3, 343.2, 422.1, 423, 432.2, 435.2, 455/436, 437, 439, 449, 522, 552.1, 561, 455/562.1, 571; 370/311, 318, 320, 329, 370/334, 335, 338, 342, 465
See application file for complete search history.

(56) References Cited

U.S. PATENT DOCUMENTS

| | | | | |
|---|---|---|---|---|
| 2004/0120290 | A1* | 6/2004 | Makhijani et al. | 370/335 |
| 2005/0136960 | A1* | 6/2005 | Timus et al. | 455/522 |
| 2005/0164730 | A1* | 7/2005 | Chen et al. | 455/522 |
| 2008/0016424 | A1* | 1/2008 | Chen | 714/752 |
| 2008/0132186 | A1 | 6/2008 | Jun et al. | |
| 2008/0176594 | A1* | 7/2008 | Song et al. | 455/522 |

FOREIGN PATENT DOCUMENTS

| | | | | |
|---|---|---|---|---|
| EP | 1 533 915 | | 5/2005 | |
| EP | 1 763 276 | | 3/2007 | |
| EP | 1763276 | A * | 3/2007 | 307/87 |
| KR | 10-0548365 | | 2/2006 | |
| KR | 10-0819294 | | 4/2008 | |
| KR | 10-0819882 | | 4/2008 | |

OTHER PUBLICATIONS

"3rd Generation Partnership Project; Technical Specification Group GSM/EDGE Radio Access Network; Radio Subsystem Link Control (Release 6)", Aug. 1, 2003, pp. 1-109. "Digital cellular telecommunications system (Phase 2+); Radio transmission and reception (3GPP TS 45.005 version 7.13.0 Release 7); ETSI TS 145 005" ETSI TS 145 005, ETSI Standards, LIS, Sophia Antipolis Cedex, France, vol. 3-G1, No. V7.13.0, Apr. 1, 2008, pp. 1-188.
European Search Report issued Nov. 24, 2009 by the European Patent Office in European Patent Application 09158774.1.

\* cited by examiner

*Primary Examiner* — Dwayne Bost
*Assistant Examiner* — Inder Mehra
(74) *Attorney, Agent, or Firm* — H.C. Park & Associates, PLC

(57) ABSTRACT

The present invention relates to a method for controlling a transmission power of a dual standby mode mobile terminal. A method of controlling a transmission power of the invention includes performing a conversation standby service with a first communications network while performing a conversation service with a second communications network, and receiving a first power control level from a base station of the first communications network; comparing a second power control level that corresponds to a power code, which is set for a current output signal power, with the first power control level; and decreasing a current power code when the first power control level is greater than or equal to the second power control level.

13 Claims, 6 Drawing Sheets

FIG. 4A

| POWER CONTROL LEVEL | SIGNAL INTENSITY | POWER CODE |
|---|---|---|
| 5 | 33dBm | 750 |
| 6 | 31dBm | 680 |
| 7 | 29dBm | 610 |
| . | . | . |
| 18 | 7dBm | 250 |
| 19 | 5dBm | 210 |

FIG. 4B

| POWER CONTROL LEVEL | SIGNAL INTENSITY | POWER CODE |
|---|---|---|
| 5 | 32.72dBm | 740 |
| 6 | 31dBm | 680 |
| 7 | 29dBm | 610 |
| . | . | . |
| 18 | 7dBm | 250 |
| 19 | 5dBm | 210 |

FIG. 4C

| POWER CONTROL LEVEL | SIGNAL INTENSITY | POWER CODE |
|---|---|---|
| 5 | 33dBm | 750 |
| 6 | 31dBm | 680 |
| 7 | 29dBm | 610 |
| . | . | . |
| 18 | 7dBm | 250 |
| 19 | 5dBm | 210 |

FIG . 4D

| POWER CONTROL LEVEL | SIGNAL INTENSITY | POWER CODE |
|---|---|---|
| 5 | 33dBm | 750 |
| 6 | 30.72dBm | 670 |
| 7 | 29dBm | 610 |
| . | . | . |
| 18 | 7dBm | 250 |
| 19 | 5dBm | 210 |

FIG . 4E

| POWER CONTROL LEVEL | SIGNAL INTENSITY | POWER CODE |
|---|---|---|
| 5 | 33dBm | 750 |
| 6 | 28.72dBm | 600 |
| 7 | 29dBm | 610 |
| . | . | . |
| 18 | 7dBm | 250 |
| 19 | 5dBm | 210 |

FIG . 4F

| POWER CONTROL LEVEL | SIGNAL INTENSITY | POWER CODE |
|---|---|---|
| 5 | 33dBm | 750 |
| 6 | 29dBm | 610 |
| 7 | 29dBm | 610 |
| . | . | . |
| 18 | 7dBm | 250 |
| 19 | 5dBm | 210 |

FIG. 4G

| POWER CONTROL LEVEL | SIGNAL INTENSITY | POWER CODE |
|---|---|---|
| 5 | 33dBm | 750 |
| ~~6~~ | ~~29.32dBm~~ | ~~620~~ |
| 7 | 29dBm | 610 |
| . | . | . |
| 18 | 7dBm | 250 |
| 19 | 5dBm | 210 |

FIG. 4H

| POWER CONTROL LEVEL | SIGNAL INTENSITY | POWER CODE |
|---|---|---|
| 5 | 33dBm | 750 |
| ~~6~~ | ~~29dBm~~ | ~~610~~ |
| 7 | 29dBm | 610 |
| . | . | . |
| 18 | 7dBm | 250 |
| 19 | 5dBm | 210 |

FIG. 4I

| POWER CONTROL LEVEL | SIGNAL INTENSITY | POWER CODE |
|---|---|---|
| 5 | 33dBm | 750 |
| ~~6~~ | ~~29.32dBm~~ | ~~620~~ |
| 7 | 29dBm | 610 |
| . | . | . |
| 18 | 7dBm | 250 |
| 19 | 5dBm | 210 |

METHOD FOR CONTROLLING POWER IN DUAL-STANDBY MODE MOBILE TERMINAL AND APPARATUS THEREOF

CROSS REFERENCE TO RELATED APPLICATION

This application claims priority from and the benefit of Korean Patent Application No. 10-2008-0044078, filed on May 13, 2008, which is hereby incorporated by reference for all purposes as if fully set forth herein.

BACKGROUND OF THE INVENTION

1. Field of the Invention

The present invention relates to a method for controlling the transmission power of a dual standby mode mobile terminal.

2. Discussion of the Background

A dual standby mode mobile phone is a mobile terminal that supports two wireless communications having different communication modes, and it is generally used in a region covered by different communication networks. For example, a mobile terminal may be used for both a Global System for Mobile communications (GSM) wireless communications mode and a Code Divisional Multiple Access (CDMA) wireless communications mode. However, the dual mode mobile phone may use one communications processor that supports both the GSM mode and the CDMA mode. Therefore, one communications mode cannot be used while the other communications mode is performed. Recently, in order to solve this problem, a dual standby mode mobile terminal, which simultaneously supports two communications modes, has been introduced. Even when in a standby mode, the dual standby mode mobile terminal periodically requests and receives a preamble and/or a pilot channel signal from a base station of a CDMA and GSM network to measure a channel condition (RSSI, CINR and SoQ or the like).

Therefore, the power consumption can be greater than that of a general mobile terminal, since the above described state means that the power of a communications device, such as an antenna for using a heterogeneous network, a RF wireless frequency apparatus, and a modem, is always turned on. Particularly, in case of a call standby state, although it is sufficient to receive a signal with the signal intensity to the extent that a GSM call can be maintained, the mobile terminal may transmit a signal using more electric power than necessary. Accordingly, this causes unnecessary power consumption in the mobile terminal. Moreover, in the CDMA and GSM dual standby mode mobile terminal, generally, the intensity of a transmission signal of GSM mode consumes about 10 dB more power in comparison with the CDMA mode. Therefore, the transmission signal of the GSM mode call affects the receive signal of a CDMA mode call. Accordingly, there is a problem in that, particularly, during a call of the CDMA mode, speech quality can be degraded in the standby of a GSM mode call.

SUMMARY OF THE INVENTION

The present invention provides a minute power control method to reduce a power consumption of a mobile terminal a GSM mode call is in a call standby state during a CDMA mode call. Moreover, the present invention may optimize the intensity of an output signal of a GSM mode call so as to minimize an influence on a speech quality of a CDMA mode call when the GSM mode call is in a call standby state during a CDMA mode call.

Additional features of the invention will be set forth in the description which follows, and in part will be apparent from the description, or may be learned by practice of the invention.

The present invention discloses a method of controlling a transmission power of a dual standby mode mobile terminal that includes performing a conversation standby service with a first communications network while performing a conversation service with a second communications network, and receiving a first power control level from a base station of the first communications network. A second power control level, which corresponds to a current power code that is set for a current output signal power of the mobile terminal, is compared with the first power control level. The current power code is decreased when the first power control level is greater than or equal to the second power control level.

The present invention also discloses a method of controlling a transmission power of a dual standby mode mobile terminal that includes performing a conversation standby service with a second communications network while performing a conversation service with a first communications network, and receiving a first power control level from a base station of the first communications network. A second power control level, which corresponds to a current power code that is set for a current output signal power of the mobile terminal, is compared with the first power control level. The current power code is decreased when the first power control level is greater than or equal to the second power control level. The current power code is increased when the first power control level is less than the second power control level.

The present invention also discloses a dual standby mode mobile terminal that includes a first wireless communications unit to send and receive a call using a first communications network, a second wireless communications unit to send and receive a call using a second communications network, a storage to store a power code that corresponds to a power control level, and a controller to control an intensity of a transmission signal correspondingly to the power code. When the first wireless communications unit and the second wireless communications unit each simultaneously send and receive a call, the controller decreases a current power code when a first power control level, which is received from a base station of the first communications network, is greater than or equal to a second power control level, which corresponds to the current power code. The controller also increases the current power code when the first power control level is less than the second power control level.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4A, FIG. 4B, FIG. 4C, FIG. 4D, FIG. 4E, FIG. 4F, FIG. 4G, FIG. 4H, and FIG. 4I show examples of the change of a power code according to the method shown in FIG. 3.

DETAILED DESCRIPTION OF THE ILLUSTRATED EMBODIMENTS

Figure 1:
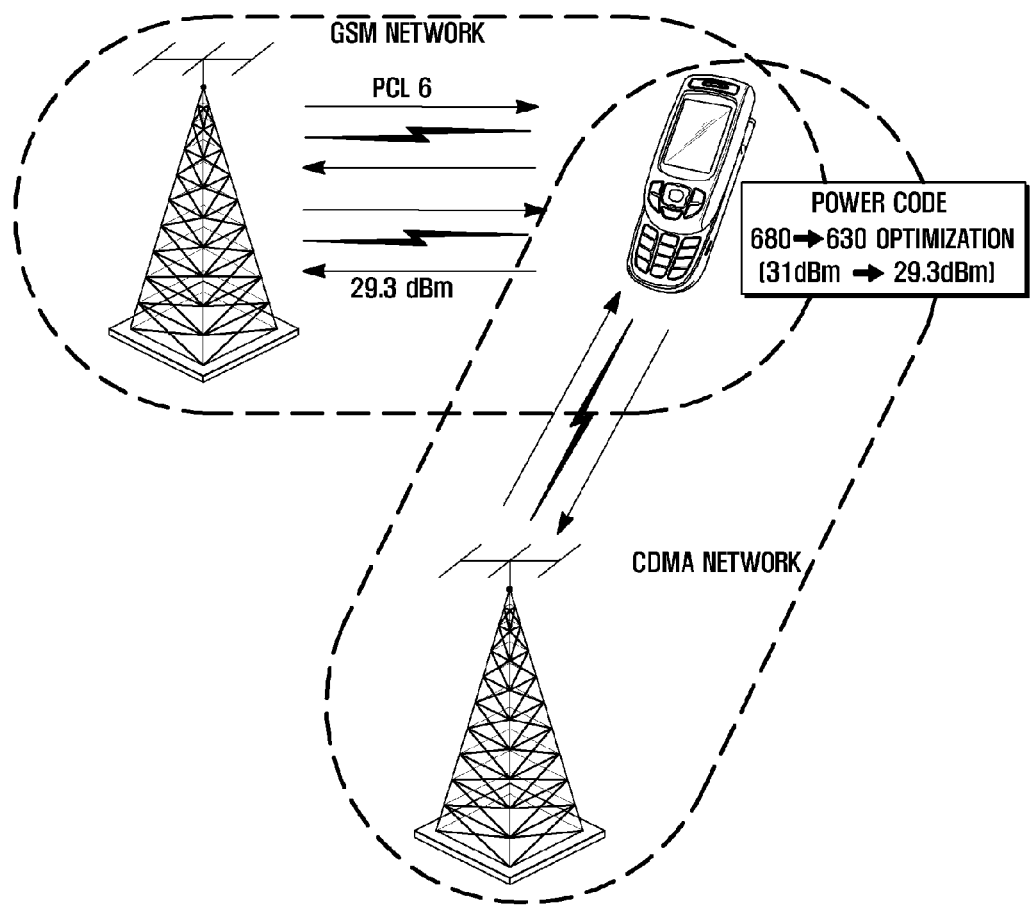
FIG. 1 is a conceptual diagram of a standby call of a mobile terminal using different wireless networks according to an exemplary embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The different wireless networks described below include a Code Division Multiple Access (CDMA) communications network and Global System for Mobile communication (GSM) communications network. However, the present invention may be applied to other wireless networks. For example, communications networks such as GSM, General packet wireless service (GPRS), Enhanced Data GSM Environment (EDGE), Universal mobile telecommunications system (UMTS), CDMA, Wideband code division multiple access(WCDMA), Wi-Fi and Wireless Broadband Internet (WiBro) or the like can be used, and the present invention can be variously applied to an expanded form and varied forms of the above-described communications networks. As an example, however, it is assumed below that a first communications network is a GSM communications network, and a second communications network is a CDMA communications network.

As described below, a first power control level means a power control level of a GSM mode call that is received at a mobile terminal from a base station through a first wireless communications unit. A power code means a code for controlling the power of an output signal of the mobile terminal, and the mobile terminal transmits a signal with an intensity mapped to the power code. Further, a second power control level is a power control level that corresponds to a power code that is set in the mobile terminal. The second power control level is used to compare the intensity of the first power control level that is re-received from the base station with the intensity of the output signal of the mobile terminal.

Table 1, which is shown below, is an example of a table showing a power control level and a power code that can be applied to a power control method according to an exemplary embodiment of the present invention, when both of the first wireless communications unit and the second wireless communications unit are operated.

TABLE 1

| base station command | mobile terminal power code | |
| --- | --- | --- |
| power control level | power code | signal intensity |
| | 33 dBm | 750 | 33 dBm |
| | | 740 | 32.72 dBm |
| | | 730 | 32.44 dBm |
| | | 720 | 32.16 dBm |
| | | 710 | 31.88 dBm |
| | | 700 | 31.6 dBm |
| | | 690 | 31.32 dBm |
| 6 | 31 dBm | 680 | 31 dBm |
| | | 670 | 30.72 dBm |
| | | 660 | 30.44 dBm |
| | | 650 | 30.16 dBm |
| | | 640 | 29.88 dBm |
| | | 630 | 29.6 dBm |
| | | 620 | 29.32 dBm |
| 7 | 29 dBm | 610 | 29 dBm |
| | | 600 | 28.72 dBm |
| | | 590 | 28.44 dBm |
| | | 580 | 28.16 dBm |
| | | 570 | 27.88 dBm |
| | | 560 | 27.6 dBm |
| | | 550 | 27.32 dBm |
| . | . | . | . |
| . | . | . | . |
| . | . | . | . |
| 18 | 7 dBm | 250 | 7 dBm |
| | | 240 | 6.5 dBm |
| | | 230 | 6 dBm |
| | | 220 | 5.5 dBm |
| 19 | 5 dBm | 210 | 5 dBm |

According to Table 1, a plurality of power codes may correspond to one power control level. However, the difference between the power codes and the number of power codes are exemplary and can be arbitrarily set. The power codes can be differently stored for each mobile terminal. Further, in Table 1, a plurality of power codes is allocated to one power control level. However, it is just a configuration for the convenience of illustration, and it is obvious to a person skilled in the art to which the present invention belongs that the power code itself can be increased or decreased based on a certain value. The overall operation of an exemplary embodiment of the present invention will be described with reference to Table 1, FIG. 1, and FIG. 2.

FIG. 1 is a drawing for illustrating a standby call of a dual standby mode mobile terminal using different wireless networks according to an exemplary embodiment of the invention.

The dual standby mode mobile terminal is positioned within the coverage area of the CDMA and GSM networks. Here, the mobile terminal sends and receives a call through a base station of GSM network base stations, and sends and receives a call through a base station of CDMA network base stations. Moreover, a GSM network base station continually transmits a power control level (PCL) of a GSM mode call to a mobile terminal. For example, the base station transmits a command indicating that the base station transmits a signal with a power control level 6, or an intensity of 31 dBm, to the mobile terminal. The mobile terminal that receives the command then sets the power code as 680, which corresponds to the power control level 6, and transmits a signal.

However, the practically required intensity of an output signal can be smaller than 31 dBm, for example, 29.6 dBm. Therefore, the power code of the mobile terminal may be gradually reduced to 630, which corresponds to 29.6 dBm per Table 1, so that transmission power may be optimized.

Figure 2:
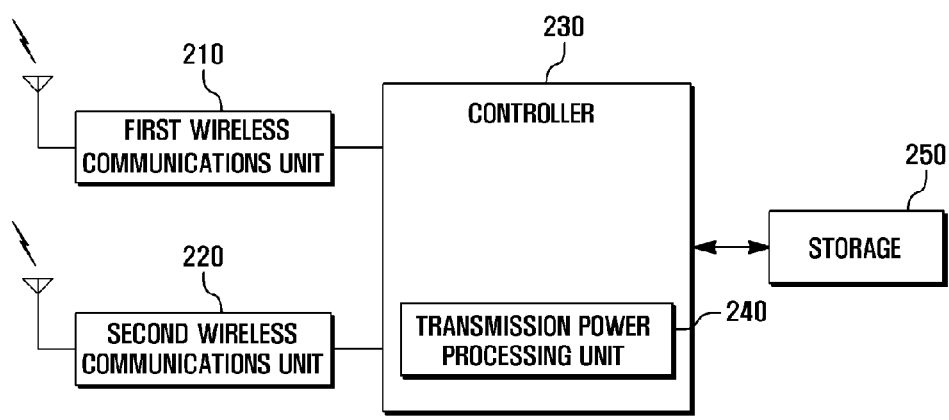
FIG. 2 is a configuration diagram that shows an example of a structure of a dual standby mode mobile terminal according to an exemplary embodiment of the invention.

FIG. 2 is a configuration diagram that shows the structure of a dual standby mode mobile terminal according to an exemplary embodiment of the invention.

The dual standby mode mobile terminal according to an exemplary embodiment of the invention includes a first wireless communications unit 210, a second wireless communications unit 220, a controller 230, and storage 250. Moreover, the dual standby mode mobile terminal can further include a display unit and an input unit. The first wireless communications unit 210 can communicate with a first communications network to send and receive a call, and the second wireless communications unit 220 can communicate with a second communications network to send and receive a call. As shown in FIG. 1, the first communications network can be a GSM communications network, and the second communications network can be a CDMA communications network.

The storage 250 can store a table of a power control level, a power code, and a signal intensity, which may be used to perform the power control of a GSM mode call. That is, a table like Table 1 can be stored in storage 250. The controller 230 includes a function of performing a power control algorithm of the invention. Moreover, the controller 230 can include a transmission power processing unit 240 to control the transmission power of the first wireless communications unit and the second wireless communications unit. Here, according to exemplary embodiments of the present invention, the transmission power processing unit 240 can transmit a signal with the intensity corresponding to the power code that is set in the transceiving of the GSM mode call.

Moreover, when the first power control level of a GSM mode call received from the base station is greater than or equal to the second power control level, which corresponds to the mobile terminal's present power code, the controller 230 reduces the current power code. On the other hand, when the first power control level is less than the second power control level, the controller 230 increases the current power code. Further, when the current power code is consecutively increased more than a set number of times, the current power code can be reset with a power code that corresponds to the current first power control level received from the base station.

A transmitting power control method of dual standby mode mobile terminal will be described in detail below with reference to Table 1, FIG. 3, FIG. 4A, FIG. 4B, FIG. 4C, FIG. 4D, FIG. 4E, FIG. 4F, FIG. 4G, FIG. 4H, and FIG. 4I, in the case when a GSM mode call is in a call standby state during the speaking of a CDMA mode call. Particularly, the transmitting power control method will be shown and described in detail on the assumption that the transmitting power of maintaining the call standby state is enough to use in the call standby state of a GSM mode call.

Figure 3:
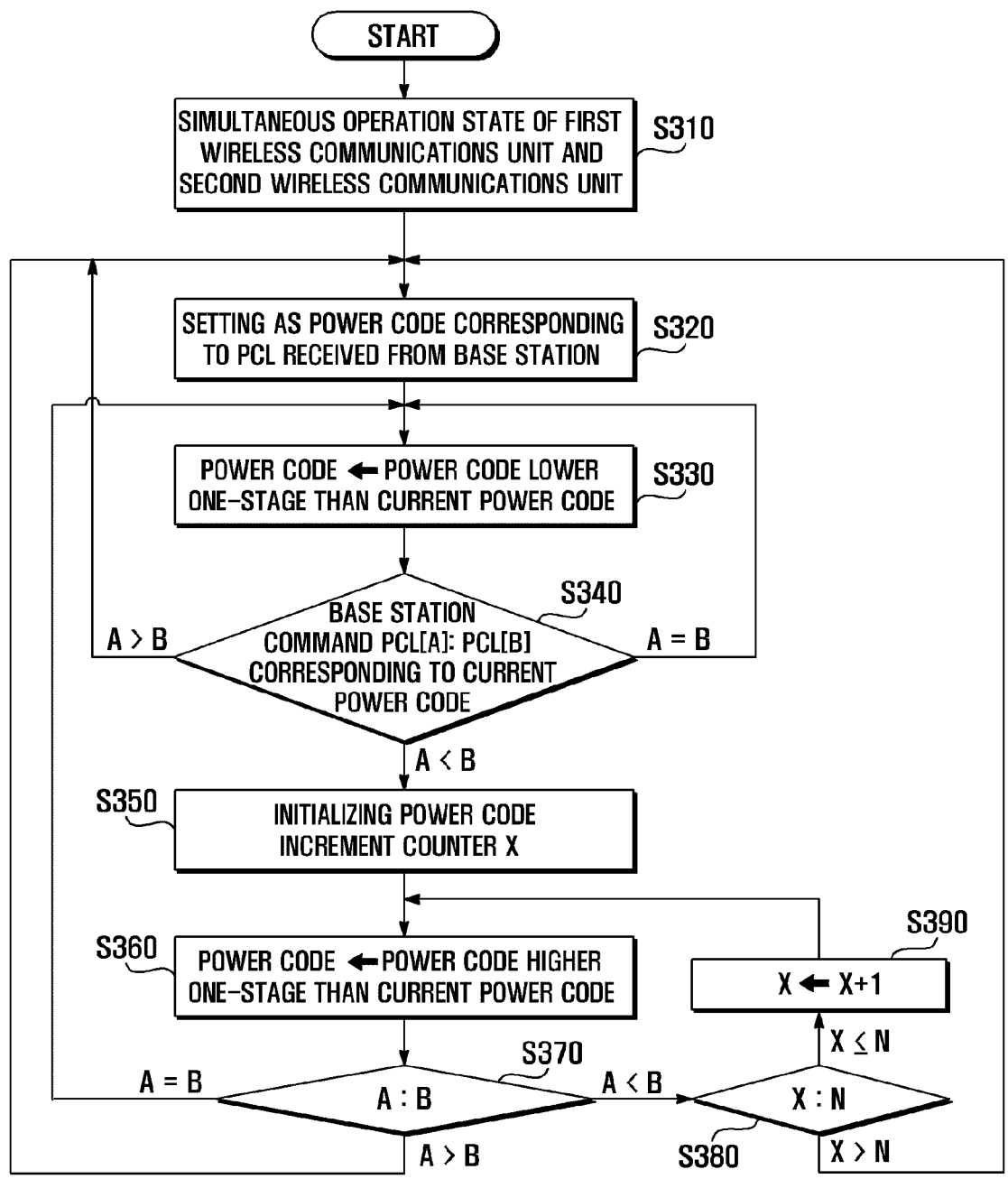
FIG. 3 is a flowchart that shows a power control method according to an exemplary embodiment of the invention.

FIG. 3 is a flowchart that shows a power control method according to an exemplary embodiment of the present invention, and FIG. 4A, FIG. 4B, FIG. 4C, FIG. 4D, FIG. 4E, FIG. 4F, FIG. 4G, FIG. 4H, and FIG. 4I show examples of the change of the current power code according to the method of FIG. 3.

Firstly, the mobile terminal continually receives a first power control level of a GSM mode call, that is, PCL from a base station, when the CDMA mode call is busy by using a second wireless communications unit 220, while the GSM mode call is in the call standby state by using a first wireless communications unit 210 (S310). The controller 230 sets the power code with a value that corresponds to the first power control level received from the base station (S320), and transmits a call with the signal intensity mapped to the power code by using the first wireless communications unit 210.

The controller 230 resets the power code to be a power code that is one-stage lower than the set power code (S330). Even during this operation, the base station continually transmits the first power control level to the mobile terminal, and the mobile terminal receives it.

That is, the first power control level that the mobile terminal receives is continually updated. In addition, the received first power control level may be equal to the current second power control level, which means that the intensity of the transmission signal is ample. On the other hand, the received first power control level may be less than the current second power control level, which means that the intensity of the transmission signal needs to be increased because it is weak. Moreover, the received first power control level may be greater than the current second power control level, which means that the intensity of the transmission signal needs to be decreased because it is excessive.

The controller 230 compares the first power control level re-received from the base station with the second power control level, which corresponds to the current power code (S340). When the current second power control level is less than the re-received first power control level, this means that the intensity of the current transmission signal is excessive. Thus, the controller 230 returns to step S320 to reset the power code as a power code that corresponds to the first power control level received from the base station, and then performs step S330.

In addition, when the current second power control level is equal to the re-received first power control level, the controller 230 returns to step S330 to reset the power code as a power code that is one-stage lower than the currently-set power code.

Finally, when the re-received first power control level is less than the current second power control level, this means that the intensity of the transmission signal needs to be increased since the intensity of the current transmission signal is not able to maintain the call standby of a GSM mode call. Therefore, the controller 230 performs a step of increasing the power code at steps S350 and S360.

Summarizing the process to step S340 with reference to FIGS. 4A to 4E, when the mobile terminal receives the first power control level 5 from the base station at S320, the controller 230 sets the power code to 750 (FIG. 4A), and then, the controller 230 resets the power code to 740 (FIG. 4B) at S330. Moreover, when the first power control level re-received from the base station is 6, the second power control level that corresponds to the power code 740 is 5, such that the controller 230 resets the power code to 680 (FIG. 4C) at S320 to correspond with the first power control level (i.e., 6) re-received from the base station. Moreover, when the second power control level that corresponds to the power code 680 is 6 while the first power control level re-received from the base station is also 6, the controller 230 resets the power code to 670 at step S330 (FIG. 4D).

Until the second power control level, which corresponds to the current power code, is greater than the first power control level re-received from the base station, that is, until a command that the intensity of the transmission signal should be increased is received from the base station, the controller 230 continually reduces the power code.

FIG. 4E shows that the power code is reduced to 600. That is, until a first power control level that is less than the second power control level, which corresponds to the current power code, is received from the base station, the controller 230 continually reduces the power code. In FIG. 4E, the second power control level that corresponds to the power code 600 is 7, as seen by Table 1, while the first power control level re-received from the base station is 6. Therefore, the controller increases the intensity of the transmission signal so as to maintain the call standby state of the GSM mode call.

The process of increasing the power code is a process of increasing the signal intensity due to the weakness of the intensity of the transmission signal. However, if a signal is transmitted without a sufficient intensity within a predetermined time, the call may be cut off. Therefore, when a threshold value N is set and the power code increasing process is repetitively performed N times, if the first power control level, which the base station commanded, is not identical with the second power control level corresponding to the power code after N times, a step should be included in which the power code is reset to a power code corresponding to the first power control level and initialized.

Therefore, when it is determined that the first power control level re-received from the base station is smaller than the second power control level that corresponds to the current power code at step S340, the controller 230 initializes the power code increment counter X at step S350, and resets the power code to 610, which is a power code that is one-stage higher than the current power code of FIG. 4E, as shown in FIG. 4F (S360).

That is, the mobile terminal transmits a signal with the intensity of the transmission signal corresponding to the current power code, and the base station determines that the received signal intensity is insufficient to maintain the call standby of the GSM mode call and then transmits a command to the mobile terminal that the intensity of the transmission signal should be increased. Therefore, the controller 230 of the mobile terminal increases the power code by one-stage. The controller 230 compares the second power control level that corresponds to the current power code with the first power control level re-received from the base station (S370).

Here, when it is determined that the first power control level re-received from the base station is less than the second power control level that corresponds to the current power code, this means that the power should be increased further. Therefore, the controller 230 compares the counter X with the power code increment threshold value N (S380).

At step S380, if X is smaller than N or identical with N, the controller 230 increases the counter X by 1 (S390), and then increases the power code by re-executing step S360, as shown in FIG. 4G. Moreover, if it is determined that X is greater than N when comparing the counter X with the threshold value N at step S380, the controller 230 returns to step S320, and resets the power code to a power code that corresponds to the first power control level that is re-received from the base station, and then re-executes step S330.

As described above, even though the process of increasing the power code is performed, if the signal is not transmitted with the transmission signal intensity corresponding to the first power control level received from the base station within a given time, the GSM mode call can be cut off. Therefore, if X exceeds the set number N, in order to prevent the call from being cut off, the controller 230 resets the power code as a power code corresponding to the first power control level which the base station commanded, and re-executes the steps from S320.

In summary, when a command for increasing the intensity of the transmission signal is received from the base station even after repeating the power code increment process over N times, the controller 230 resets the power code as a power code corresponding to the first power control level re-received from the base station, and then re-executes the steps from S330. That is, the controller 230 initializes all processes described in the above and re-executes the method for power control of the invention based on the first power control level re-received from the base station.

Moreover, when it is determined that the first power control level re-received from the base station is greater than the second power control level, which corresponds to the current power code, at step S370, this means that the base station commanded to reduce the intensity of the transmission signal. Therefore, the controller 230 returns to step S320 and resets the power code as a power code that corresponds to the first power control level re-received from the base station, and then re-executes step S330.

Finally, when it is determined that the first power control level re-received from the base station is identical with the second power control level at step S370, as shown in FIG. 4H, the controller 230 re-executes step S330. That is, the power code will be reduced by one-stage through step S330, and then, as shown in FIG. 4I, the power code will be increased by one-stage through step S360 so that the optimized transmission power may be maintained.

Figure 5:
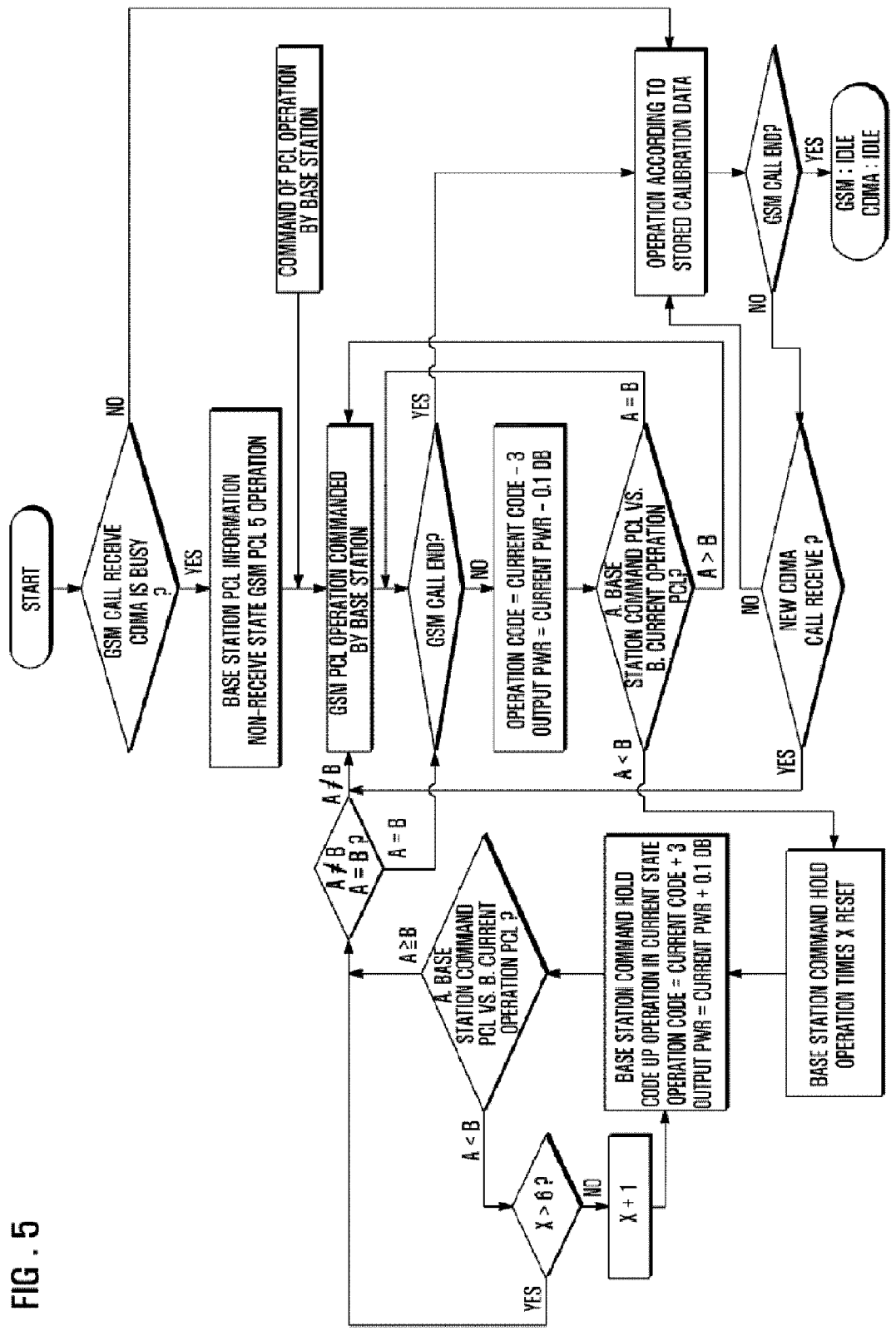
FIG. 5 is a flowchart showing an example of a power control method for a dual standby mode mobile terminal according to an exemplary embodiment of the invention.

FIG. 5 is an example of a GSM/CDMA dual standby mode mobile terminal applying a method for power control according to an exemplary embodiment of the invention.

According to the method for power control suggested as described above, an efficient minute power control in a call standby state of a GSM mode call is available, in particular, an algorithm of maintaining the intensity of the minimum transmission signal that is capable of maintaining the call standby state of GSM mode call is suggested, so that the power consumption of the dual standby mode mobile terminal can be reduced.

Moreover, during the speech of a CDMA mode call, the call of the GSM mode maintains the intensity of the transmission signal of the GSM mode call to a minimum in the call standby state, so that the speech quality of CDMA mode call can be improved in the dual standby mode mobile terminal. In this example, exemplary embodiments of the present invention can be applied to not only a method for power control of a GSM mode call in case of the call standby state of the GSM mode call during the speech of a CDMA mode call, but also to a method for power control of a GSM mode call in case of the call standby state of the CDMA mode call during the speech of GSM mode call. That is, even in case of the call standby state of the CDMA mode call during the speech of GSM mode call, the intensity of the transmission signal of the GSM mode call may be optimized such that the power consumption can be reduced.

In the dual standby mode mobile terminal, when the call of the GSM mode and call of the CDMA mode are simultaneously transceived, according to the method for controlling electric power of GSM mode call, the power consumption of the dual standby mode mobile terminal can be reduced, and the influence on a wireless communications unit of CDMA mode is reduced such that a speech quality can be improved It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of controlling a power of a dual standby mode mobile terminal, the method comprising:

performing a conversation standby service with a first communications network while performing a conversation service with a second communications network, and receiving a first power control level from a base station of the first communications network;

comparing a second power control level, which corresponds to a current power code that is set for a current output signal power of the mobile terminal, with the first power control level; and decreasing the current power code when the first power control level is greater than or equal to the second power control level.

2. The method of claim 1, further comprising increasing the current power code when the first power control level is less than the second power control level.

3. The method of claim 2, wherein a plurality of power codes corresponds to the second power control level.

4. The method of claim 3, wherein the first communications network is a Global System for Mobile communication communications network.

5. The method of claim 4, wherein the second communications network is a Code Division Multiple Access communications network.

6. The method of claim 2, further comprising changing the current power code into a power code corresponding to a power control level of a first call received from the base station after the step of increasing the current power code is consecutively performed for a set number of times.

7. A method of controlling a power of a dual standby mode mobile terminal, the method comprising:

performing a conversation standby service with a second communications network while performing a conversation service with a first communications network, and receiving a first power control level from a base station of the first communications network;

comparing a second power control level, which corresponds to a current power code that is set for a current output signal power of the mobile terminal, with the first power control level;

decreasing the current power code when the first power control level is greater than or equal to the second power control level; and increasing the current power code when the first power control level is less than the second power control level.

8. The method of claim 7, wherein the first communications network is a Global System for Mobile communication communications network.

9. The method of claim 8, wherein the second communications network is a Code Division Multiple Access communications network.

10. A dual standby mode mobile terminal, comprising:

a first wireless communications unit to send and receive a call using a first communications network;

a second wireless communications unit to send and receive a call using a second communications network;

a storage to store a power code that corresponds to a power control level; and a controller to control an intensity of a transmission signal correspondingly to the power code, and when the first wireless communications unit and the second wireless communications unit each simultaneously send and receive a call, the controller decreases a current power code when a first power control level, which is received from a base station of the first communications network, is greater than or equal to a second power control level, which corresponds to the current power code and increases the current power code when the first power control level is less than the second power control level.

11. The dual standby mode mobile terminal of claim 10, wherein the first communications network is a Global System for Mobile communication communications network.

12. The dual standby mode mobile terminal of claim 11, wherein the second communications network is a Code Division Multiple Access communications network.

13. The dual standby mode mobile terminal of claim 10, wherein when the current power code is consecutively increased over a set number of times, the controller resets the current power code to a power code that corresponds to a power control level of a first call received from a base station.

* * * * *